United States Patent [19]

Palmer

[11] Patent Number: 5,737,131
[45] Date of Patent: Apr. 7, 1998

[54] NIGHT VISION MONOCULAR

[75] Inventor: Gary Lynn Palmer, Vinton, Va.

[73] Assignee: ITT Corporation, New York, N.Y.

[21] Appl. No.: 472,677

[22] Filed: Jun. 7, 1995

Related U.S. Application Data

[63] Continuation-in-part of Ser. No. 152,193, Nov. 12, 1993, abandoned.

[51] Int. Cl.$^6$ .............................. G02B 7/02; G02B 23/00
[52] U.S. Cl. ........................ 359/819; 359/350; 359/399; 359/811; 359/827
[58] Field of Search ...................... 359/350, 353, 359/356, 399–419, 808–826, 895; D16/133; 250/214 VT, 333

[56] References Cited

U.S. PATENT DOCUMENTS

| | | | |
|---|---|---|---|
| 4,154,510 | 5/1979 | Katagiri | 359/826 |
| 4,269,479 | 5/1981 | Hamatani | 359/826 |
| 5,084,780 | 1/1992 | Phillips | 359/353 |
| 5,202,706 | 4/1993 | Hasegawa | 359/819 |
| 5,204,774 | 4/1993 | Owen, Jr. et al. | 359/418 |
| 5,214,533 | 5/1993 | Moracchinni | 359/819 |
| 5,218,484 | 6/1993 | Terai | 359/823 |
| 5,495,364 | 2/1996 | Palmer | 359/407 |

FOREIGN PATENT DOCUMENTS

| | | | |
|---|---|---|---|
| 196213 | 8/1986 | Japan | 359/879 |

*Primary Examiner*—Thong Nguyen
*Attorney, Agent, or Firm*—Plevy & Associates

[57] ABSTRACT

A night vision monocular that includes an objective lens subassembly for receiving low intensity and/or infrared light. The objective lens subassembly focuses the light onto an image intensifier tube that converts the light into a visible image. The visible image passes through a collimator subassembly that collimates the visible image. Finally, the collimated image is viewed through an eyepiece subassembly. The objective lens subassembly, image intensifier tube, collimator subassembly and eyepiece subassembly are each separately manufactured subassemblies that are encased in subhousings and are ready to be assembled into a larger optical device. The housing of the present invention night vision monocular is a two piece structure, having a first half and an opposite second half. Partitions extend inwardly from a plurality of locations on both halves of the housing. The partitions are contoured and positioned to abut against and retain the various subassemblies within the night vision device. At least two partitions from each half of the housing abut against and support the objective lens subassembly, the image intensifier tube, the collimator subassembly and the eyepiece subassembly. The partitions within the housing are the only elements of positioning and optically aligning the various subassemblies. Consequently, no adhesive or mechanical fasteners are needed to retain components within the housing. The housing itself need not be precision machined, consequently, a night vision device is provided that is easy to manufacture and is well suited for a low-cost mass-production manufacturing environment.

12 Claims, 4 Drawing Sheets

NIGHT VISION MONOCULAR

CONTINUATION-IN-PART APPLICATION

This is a Continuation-In-Part application of application Ser. No. 08/152,193, filed on Nov. 12, 1993, entitled NIGHT VISION MONOCULAR, now abandoned.

RELATED APPLICATIONS

The assignee herein, ITT Corporation, is the record owner of the following U.S. Patent Applications which are believed to be related to the matter disclosed in this application:

U.S. application Ser. No.: 08/108,989 filed Aug. 18, 1993 and entitled NIGHT VISION BINOCULARS, now U.S. Pat. No. 5,495,364;

U.S. application Ser. No.: 08/609,216 which is a Continuation of the U.S. application Ser. No. 08/315,339 filed Sep. 30, 1994 and entitled COLLIMATOR/DIOPTER ASSEMBLY WITH FOLDED OPTICS FOR A NIGHT VISION MONOCULAR DEVICE now abandoned; and U.S. application Ser. No.: 29/014,252 filed Oct. 15, 1993 and entitled NIGHT VISION MONOCULAR now abandoned.

FIELD OF THE INVENTION

The present invention relates to optical devices that enable a viewer to observe objects at night or during other low-light conditions. More particularly, the present invention relates to a hand held monocular system that can be manufactured at low cost for sale to the general public.

BACKGROUND OF THE INVENTION

Night vision devices are widely used in the military to provide soldiers, aviators and sailors with the ability to view objects at night or during other low light conditions. As a result, many night vision devices are currently being manufactured according to exacting military specifications and designs. Similarly, many such night vision devices are being manufactured for specific military applications, such as part of the sights of various weapons or as part of goggle assemblies that attach to an aviator's or soldier's helmet. As a consequence, many of the night vision devices currently being manufactured are neither affordable nor easily adapted to non-military uses by the general public.

One of the reasons why military quality night vision devices are so expensive is because of the use of exacting tolerances in the manufacture of those night vision devices. A typical night vision device contains many optical components including an image intensifier tube and several lens elements that comprise the objective lens assembly, the collimator lens assembly and the diopter lens assembly. Each of the optical elements must be precisely spaced and aligned to meet the optical performance requirements of the device. In the prior art, the various optical elements within a typical night vision device are held in place by a housing. Since the housing is responsible for the alignment and spacing of the various optical elements, the housing has to be manufactured to exacting tolerances. Such a housing is a complex structure to manufacture. As such, in order to manufacture the housing to those exacting tolerances, the housing could not be simply molded in a mass production manufacturing environment. Rather, many prior art housings were made from many finely machined components that were assembled to the exacting tolerances required. Since traditional low cost mass production techniques could not be used, the cost of night vision devices remains very high.

It is therefore the object of the present invention to provide a night vision device that can be manufactured in a cost effective manner utilizing a housing that can be molded using traditional mass production manufacturing techniques that do not require precision machining.

It is a further object of the present invention to provide component parts for the above-mentioned night vision device that are easy to manufacture and assemble, thereby further reducing the cost of manufacturing the night vision device.

SUMMARY OF THE INVENTION

The present invention is a low-cost night vision monocular. The night vision monocular includes an objective lens subassembly for receiving low intensity and/or infrared light. The objective lens subassembly focuses the light onto an image intensifier tube that converts the light into a visible image. The visible image passes through a collimator subassembly that collimates the visible image. Finally, the collimated image is viewed through an eyepiece subassembly. The objective lens subassembly, image intensifier tube, collimator subassembly and eyepiece subassembly are each separately manufactured subassemblies that are encased in subhousings and are ready to be assembled into a larger optical device. The housing of the present invention night vision monocular is a two piece structure, having a first half and an opposite second half. Partitions extend inwardly from a plurality of locations on both halves of the housing. The partitions are contoured and positioned to abut against and retain the various subassemblies within the night vision device. At least two partitions from each half of the housing abut against and support the objective lens subassembly, the image intensifier tube, the collimator subassembly and the eyepiece subassembly. The partitions within the housing are the only means of positioning and optically aligning the various subassemblies. Consequently, no adhesive or mechanical fasteners are needed to retain components within the housing. The housing itself need not be precision machined, consequently, a night vision device is provided that is easy to manufacture and is well suited for a low-cost mass-production manufacturing environment.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE INVENTION

Figure 1:
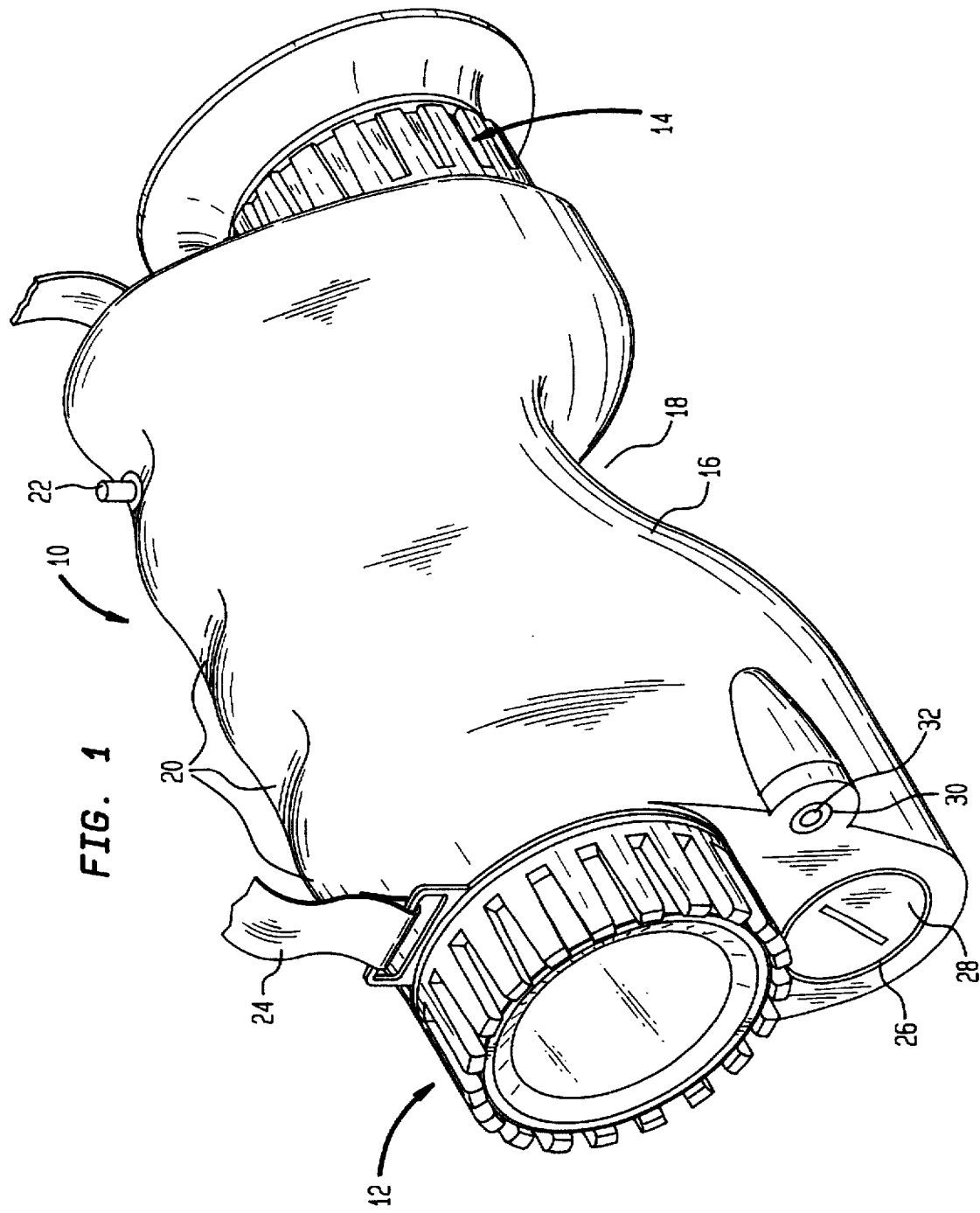
FIG. 1 is a perspective view of one preferred embodiment of the present invention night vision monocular device.

Referring to FIG. 1, one preferred embodiment of the present invention night vision monocular 10 is shown having a single objective lens assembly 12 and a single eyepiece assembly 14. As will later be explained, the night vision monocular 10 contains folded optics. Accordingly, the axis of the objective assembly 12 is not collinear with the optical axis of the eyepiece assembly 14. The housing 16 of the night vision monocular 10 is ergonomically contoured so as to be comfortably held and operated in one hand. A large indentation 18 is disposed on the bottom of housing 16. The indentation 18 is adapted to receive the space between the thumb and the fore finger as a person grasps the housing 16. Four indentations 20 are disposed on the opposite top surface of the housing 16 to receive the fore finger, middle finger, ring finger and pinky, respectively. An on/off switch 22 is disposed in the indentation 20 adapted to receive the fore finger. As such, a person grasping the night vision monocular 10 can operate the device by adjusting the force of the fore finger on the on/off switch 22. A strap 24 extends between the objective lens assembly 12 and the eyepiece assembly 14, wherein the strap 24 passes over the four indentations and helps a user to maintain a firm grip on the housing 16.

In addition to the objective lens assembly 12, two other structures are disposed on the forward face of the housing 16. A battery port 26 is provided for retaining the batteries that power the monocular 10. The battery port 26 includes a removable cover 28 that threadably engages the port 26 and holds the batteries in place. A light sensor port 30 is also disposed on the forward face of the housing 16. The light sensor port 30 enables ambient light to impinge upon a light sensor 32 position within the housing 16 proximate the port 30. The light sensor detects ambient light and deactivates the night vision monocular 10 should ambient light surpass a predetermined threshold level that may harm the device. Circuits for deactivating night vision devices depending upon ambient light are well known in the art and are exemplified by U.S. Pat. No. 5,146,077, entitled GATED VOLTAGE APPARATUS FOR HIGH LIGHT RESOLUTION AND BRIGHT SOURCE PROTECTION OF IMAGE INTENSIFIER TUBE, which is assigned to ITT Corp., the assignee herein.

Figure 2:
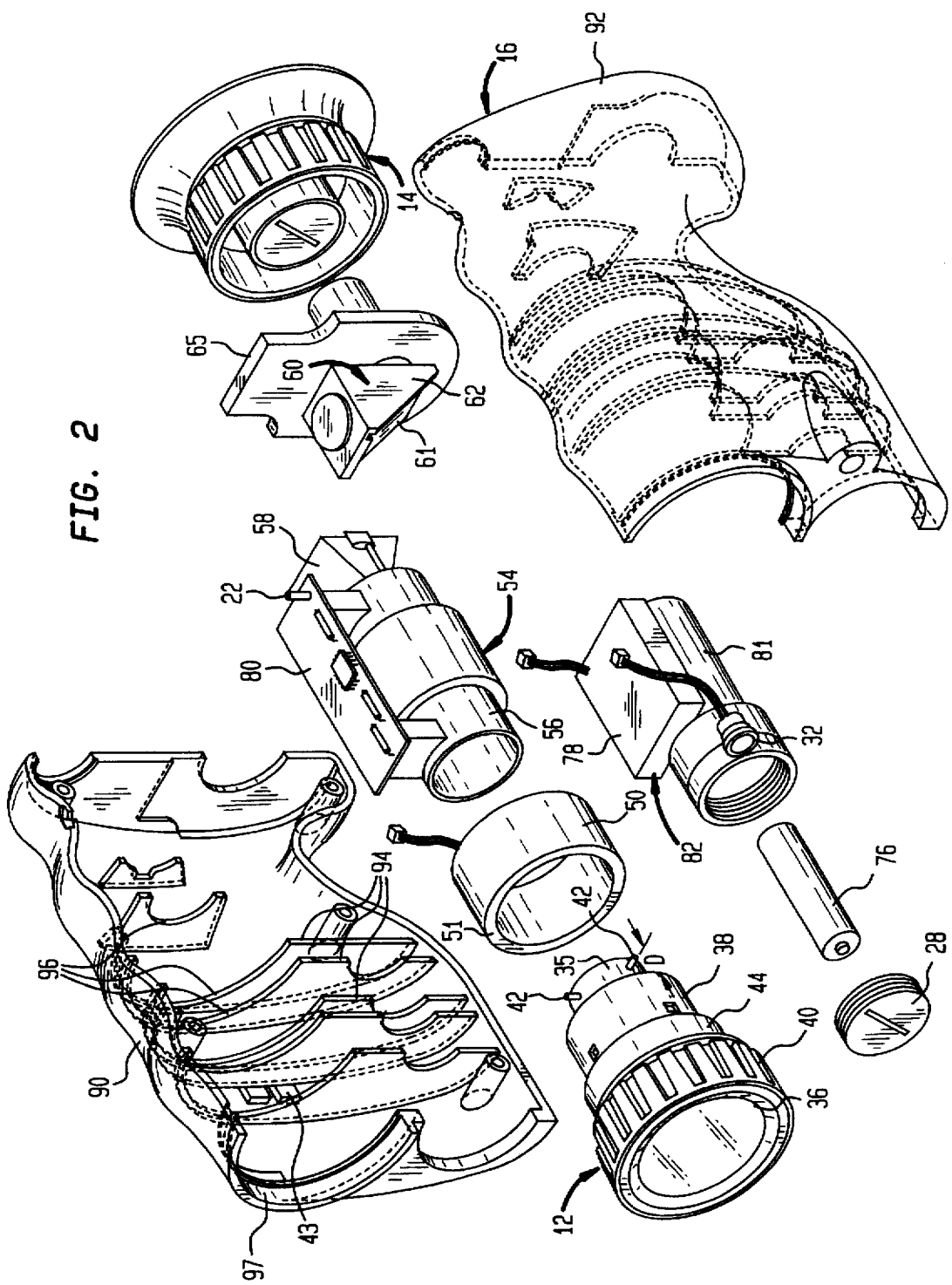
FIG. 2 is an exploded perspective view of FIG. 1 to illustrate internal components and to facilitate consideration and discussion.
Figure 3:
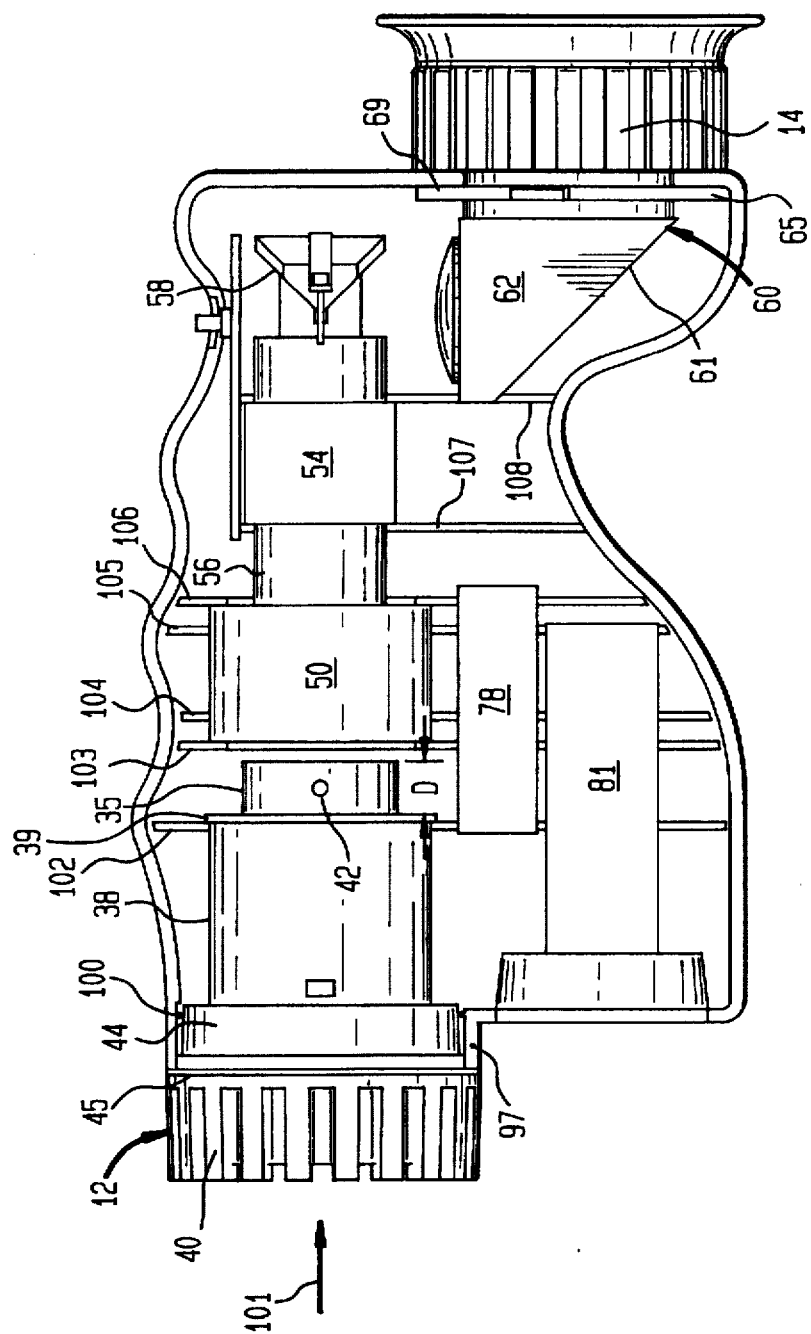
FIG. 3 is a side view of the embodiment of FIG. 1 with one half of the housing being removed to show the interrelation of subassembly components within the housing.

Referring to FIG. 2 in conjunction with FIG. 3, it can be seen that the objective lens assembly 12 is a self contained sub-assembly unit that is merely held in place by the housing 16. The objective lens assembly 12 is comprised of cylindrical subhousing 35 that contains a plurality of lens elements 36 (FIG. 2) in optical alignment at exact spacing increments. The lens elements 36 may be stacked within the cylindrical subhousing 35 with appropriately sized interposed spacers to provide the necessary spacings. As such, the lens elements 36 can be assembled within the cylindrical subhousing 35 without the need for precise machining. The cylindrical subhousing 35 is positioned within a tubular element 38. The tubular element 38 terminates at an adjustment knob 40 that extends outside of the housing 16 on the forward face of the night vision monocular 10. The cylindrical subhousing 35 is coupled to the tubular element 38 with a wide pitch threading. As such, as the adjustable know 40 is rotated, the tubular element 38 moves in relation to the cylindrical subhousing 35. Due to the wide pitch threading, the cylindrical subhousing 35 moves back and forth within the tubular element 38, thereby altering the distance D from the edge of the cylindrical subhousing 35 to the edge of the tubular element 38.

Guide poles 42 radially extend from the cylindrical subhousing 35. The guide poles 42 engage guide slots 43 (FIG. 2) on the interior surfaces of the housing 16. The presence of the guide poles 42 in the guide slots 43 prevents the cylindrical subhousing from rotating with the tubular element 38 while still enabling the cylindrical subhousing 35 to move reciprocally within the tubular element 38. A annular collar 44 passes over the tubular element 38. The annular collar 44 is shaped to engage the housing 16. The tubular element 38 is free to rotate about its longitudinal axis within the annular collar 44. As such, the presence of the annular collar 44 enables the tubular element 38 to be coupled to the housing 16 without restricting the tubular elements 38 ability to rotate with respect to the housing 16.

An image intensifier 50 is provided as a complete subassembly with an elastomeric subhousing 51. The image intensifier 50 can be either a Gen II or Gen III image intensifier tube capable of converting low intensity light received from the objective lens assembly into a visible image. A collimator subassembly 54 is provided for collimating the image produced by the image intensifier 50. The collimator subassembly contains a plurality of lens elements contained within a subassembly housing 56. Collimator lens arrangements for collimating the image of an image intensifier tube are well known as exemplified by U.S. Pat. No. 5,117,553 to Phillips et at., entitled COLLIMATOR FOR A BINOCULAR VIEWING SYSTEM and assigned to the assignee herein. U.S. Pat. No. 5,117,553 is herein incorporated by reference to show the structure of a collimator lens arrangement. Accordingly, the knob 40 operates to selectively change the optical distance between the objective lens assembly 12 and an image intensifier tube to be described further on.

A bifurcating mirror 58 is joined to the collimator subassembly housing 56 and is part of the overall collimator subassembly 54. The bifurcating mirror 58 changes the optical path of the intensifier image by 90 degrees and directs the image into a diopter cell subassembly 60. The diopter cell subassembly 60 is a self contained structure that contains at least one lens element and a mirror 61 in a subassembly housing 62. The diopter cell subassembly 60 reorients the image and directs the image into the eyepiece subassembly 14 for viewing. The structure of the diopter cell subassembly 60 is known as exemplified by U.S. Pat. No. 5,347,397 to Nelson et al., entitled DIOPTER CELL ASSEMBLY FOR A BINOCULAR VIEWING SYSTEM and assigned to the assignee herein. U.S. Pat. No. 5,347,397 is herein incorporated by reference to show the structure of a diopter cell subassembly. A flange 65 extends from the diopter cell subassembly 60 as will be later explained, the flange 65 engages a depression 69 within the housing 16, thereby joining the diopter cell subassembly 60 to the housing 16.

Figure 4:
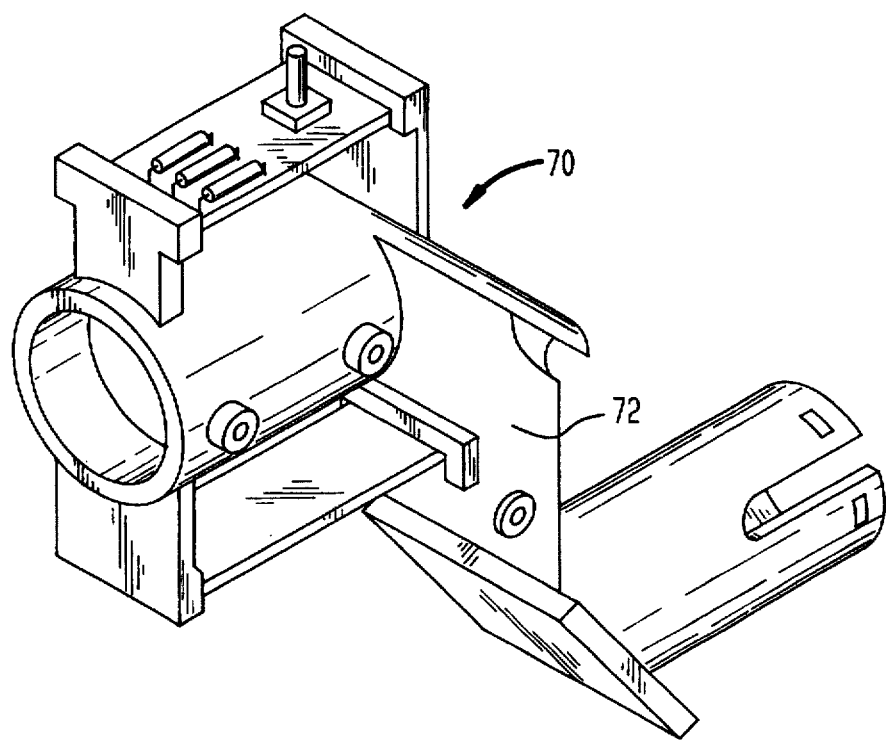
FIG. 4 is an alternate embodiment of a collimator/diopter cell subassembly that can be used in conjunction with the present invention night vision monocular.

In FIG. 4 a combined collimator/diopter subassembly 70 is also shown. The collimator/diopter subassembly 70 is comprised of a subassembly housing 72 that contains the various optical components of the collimator subassembly 54 and diopter cell subassembly 60 previously described in FIG. 2. It should therefore be understood that the collimator/diopter subassembly 70 can be substituted for the collimator subassembly 54 and diopter cell subassembly 60 shown in FIG. 2. The construction of the collimator/diopter subassembly 70 is described in U.S. patent application Ser. No. 08/315,339 filed Sep. 30, 1994, entitled COLLIMATOR/ DIOPTER ASSEMBLY WITH FOLDED OPTICS FOR A NIGHT VISION MONOCULAR DEVICE, which is assigned to the assignee herein and is incorporated herein by reference.

Referring back to FIG. 2 and FIG. 3, it can be seen that besides the various optical components, the present invention night vision monocular 10 also includes a variety of electronic components. Those components include batteries 76, a voltage regulator 78 and a circuit board 80 that contains the various control circuits that operate the night vision device 10. The batteries 76 are contained with a battery subhousing 81 that is accessed via removable port cover 28. The voltage regulator 78 is also held within a subhousing 82 wherein the various components comprising the voltage regulator 78 are potted therein. Various wire in connections connect the batteries 76 to the voltage regulator 78; the voltage regulator to the circuit board 80 and the circuit board to both the image intensifier 50 and the light sensor 32.

Looking at the housing 16 in FIG. 2, it can be seen that the housing 16 is a two piece structure having a first half 90 and a second half 92 that join together along a common seam. A plurality of partitions 94 extend inwardly from each of the housing halves 90, 92. Each of the housing halves 90, 92 have a first line of semicircular reliefs 96. When the two housing halves are assembled, the semicircular relief 96 create a series of circular apertures that are concentric with each other and are concentric with the objective lens aperture 97 in the housing 16. Although each of the circular apertures are concentric, some vary in diameter. The purpose of the partitions 94 is to engage the various subassemblies that comprise the night vision monocular 10, thereby providing a low cost manner of aligning the various components in a manner that is easily assembled.

Referring to FIG. 3, it can be seen that when assembled, a first partition 100 engages the annular collar 44 that is part of the objective lens subassembly 12. The semicircular relief defined by the first partition 100 has the same radius of curvature as does the annular collar 44. As such, the presence of the first partition 100 prevents the annular collar 44 from moving in and out of the page of FIG. 3. The annular collar 44 also includes a radial flange 45 that engages the edge of objective lens aperature 97. The abutment of the radial flange 45 against the housing prevents the radial flange 45 from moving in the direction of arrow 101. The adjustment knob 40 abuts against the opposite side of the radial flange 45, thereby preventing the tubular element 38 from moving in the direction of arrow 101.

A second partition 102 engages the tubular element 38 at the end opposite the adjustment knob 40. The semicircular relief defined by the second partition 102 has the same radius of curvature as does the tubular element 38. The presence of the second partition 102 therefore prevents the tubular element 38 from moving in any direction transverse to its longitudinal axis. The tubular element 38 also terminates with a radial flange 39. The radial flange 39 hooks over the second partition 102, thereby preventing the movement of the tubular element 38 in a direction opposite arrow 101.

A series of four partitions 103, 104, 105, 106 are used to retain the image intensifier 50 within the housing 16. The first and last partition 103, 106 abut against both ends of the image intensifier 50 preventing any lateral movement. The middle two partitions 104, 105 define semicircular reliefs with the same radius of curvature as the image intensifier 50. As such, the presence of the inner partitions 104, 105 prevent the image intensifier 50 from moving in any direction traverse to its longitudinal axis. The inner partitions 104, 105 also position the image intensifier so that it is optically aligned with the objective lens assembly 12 at a proper distance from the objective lens assembly 12.

Two partitions 107, 108 engage and support the collimator subassembly 54 in a manner that prevents the collimator subassembly 54 from moving laterally or in a direction transverse to its longitudinal axis. The partitions 107, 108 position the collimator subassembly so that it is optically aligned with both the image intensifier 50 and the diopter cell subassembly 60. It will be understood that if the collimator/diopter subassembly of FIG. 4 were substituted for the individual collimator subassembly 54 and diopter cell subassembly 60, the partitions would position and retain the collimator/diopter subassembly in the proper optical orientation and position.

Besides retaining the various optical elements in a predetermined orientation, the partitions also define recesses that engage and retain the voltage regulator 78 and the battery subhousing 81. None of the subcomponent parts within the housing 16 are mechanically affixed to the housing 16 by anything other than contact with the various partitions. As a result, it should be understood that until the two halves of the housing 16 are closed together, all the components within the housing 16 can be easily removed. Similarly, each component can be easily added to the housing 16 without tools, screws or glue. By simply placing the various components into the partition reliefs adapted to receive those components, the various components are properly aligned and positioned. Furthermore, since all the various lens are contained within preassembled subassemblies, the tolerances used in manufacturing the housing 16 are well within the range achievable by high volume injection molding techniques. Consequently, the housing 16 can be molded from inexpensive material and does not have to be machined or otherwise reworked after the molding procedure. As the two halves of the housing 16 are joined, each component is engaged by at least four partitions. (i.e. two from each half of the housing). Should any one of the partitions be manufactured out of acceptable tolerances, the remaining partitions would continue to retain the various subassemblies in the proper position and optical orientation. Accordingly, the use of multiple partitions compensates for a wide range of manufacturing tolerance variations and eliminates the need for precise machining or casting of the housing.

It will be understood that the night vision monocular assembly described herein is merely exemplary and that a person skilled in the art may make variations and modifications to the described embodiments utilizing functionally equivalent components to those described. All such variations and modifications are intended to be included within the scope of this invention as defined by the appended claims.

I claim:
1. A night vision apparatus, comprising:
    an objective lens subassembly containing a first plurality of lenses therein;
    an image intensifier tube for producing a visible image from energy directed into said image intensifier tube through said objective lens subassembly;
    a collimator subassembly containing a second plurality of lenses therein, said collimator subassembly collimating the visible image emanating from said image intensifier tube to produce a collimated image;
    means for directing and viewing said collimated image; and
    a housing having first and second opposed interior surfaces, each of said surfaces including a plurality of partitions extending therefrom for engaging and supporting said objective lens subassembly, said image intensifier tube, and said collimator subassembly in a predetermined optical relationship relative to each other and said means for directing and viewing said collimated image.

2. The apparatus according to claim 1, wherein a plurality of said partitions from both said first and second opposed interior surfaces engage and support said objective lens subassembly, said image intensifier tube and said collimator subassembly, individually.

3. The apparatus according to claim 1, wherein said objective lens subassembly, said image intensifier tube and said collimator subassembly each have an optical axis and said plurality of partitions engage and support said objective lens subassembly, said image intensifier tube and said collimator subassembly in said housing whereby the optical axis of each aligns.

4. The apparatus according to claim 1, further including a battery subhousing and a voltage regulator subassembly, wherein said battery subhousing and said voltage subassembly are supported in a predetermined position and orientation within said housing by said plurality of partitions.

5. The apparatus according to claim 1, wherein said plurality of partitions is the primary means provided for retaining said objective lens subassembly, said image intensifier tube and said collimator subassembly in said predetermined optical relationship within said housing.

6. The apparatus according to claim 1, wherein said objective lens subassembly includes a subhousing having a longitudinal axis, that retains said first plurality of lenses, said subhousing having at least one guide post extending therefrom that engages a slot disposed on an interior surface of said housing, wherein the presence of said guide post in said slot prevents said subhousing from rotating about the longitudinal axis yet enables said subhousing to reciprocally move along the longitudinal axis across a predetermined range.

7. The apparatus according to claim 6, wherein said objective lens subassembly further includes a focusing means for selectively moving said subhousing through said predetermined range, whereby said focusing means selectively changes an optical distance between said objective lens subassembly and said image intensifier tube.

8. The apparatus according to claim 1, wherein said means for directing and viewing said collimated image includes an eyepiece subassembly for viewing said collimated image and a diopter cell assembly for directing said collimated image to said eyepiece subassembly.

9. The apparatus according to claim 1, wherein said objective lens subassembly, said image intensifier tube and said collimator subassembly are disposed on a first linear optical path and said eyepiece subassembly is disposed on a different second optical path; said apparatus further including a means contained within said housing for directing said collimated image from said first linear optical path to said second optical path.

10. A night vision apparatus, comprising:

an objective lens subassembly having a first subhousing and a first plurality of lenses contained within said first subhousing;

an image intensifier tube for producing a visible image from energy directed into said image intensifier tube through said objective lens subassembly;

an eyepiece subassembly for viewing said visible image;

a collimator and diopter cell subassembly having a second subhousing and a second plurality of lenses contained within said second subhousing wherein said collimator and diopter cell subassembly collimates said visible image and directs said visible image into said eyepiece subassembly; and a housing having opposed interior surfaces, wherein said interior surfaces include a plurality of partitions extending therefrom for engaging and supporting said objective lens subassembly, said image intensifier tube, said collimator and diopter cell subassembly and said eyepiece subassembly in a predetermined optical relationship.

11. The apparatus according to claim 10, wherein said housing is ergonomically configured to be held in one hand.

12. The apparatus according to claim 10, wherein said collimator and diopter cell subassembly includes folded optics.

* * * * *